United States Patent
Russell et al.

(10) Patent No.: US 7,280,691 B2
(45) Date of Patent: Oct. 9, 2007

(54) COLOUR CORRECTION

(75) Inventors: Mark Julian Russell, Maidenhead (GB); Ian McLean, Woking (GB)

(73) Assignee: Sony United Kingdom Limited, Weybridge (GB)

( * ) Notice: Subject to any disclaimer, the term of this patent is extended or adjusted under 35 U.S.C. 154(b) by 779 days.

(21) Appl. No.: 10/782,549

(22) Filed: Feb. 19, 2004

(65) Prior Publication Data

US 2004/0165771 A1   Aug. 26, 2004

(30) Foreign Application Priority Data

Feb. 21, 2003  (GB) ................. 0304035.9

(51) Int. Cl.
*G06K 9/00* (2006.01)
(52) U.S. Cl. ..................... 382/167; 382/162
(58) Field of Classification Search ................ 382/167, 382/162; 358/520, 1.9, 518, 521, 500; 348/220.1, 348/333.11, E3.02, E3.047; 345/600, 610
See application file for complete search history.

(56) References Cited

U.S. PATENT DOCUMENTS

| | | | | |
|---|---|---|---|---|
| 5,214,753 A * | 5/1993 | Lee et al. | ................. | 345/610 |
| 5,231,504 A * | 7/1993 | Magee | ................. | 358/500 |
| 5,355,225 A | 10/1994 | Bachmann et al. | ......... | 348/645 |
| 5,506,946 A * | 4/1996 | Bar et al. | ................. | 345/600 |
| 5,828,406 A * | 10/1998 | Parulski et al. | .......... | 348/220.1 |
| 6,571,011 B1 * | 5/2003 | Andresen et al. | ........... | 382/167 |
| 7,009,733 B2 * | 3/2006 | Gruzdev et al. | ............. | 358/1.9 |
| 7,224,833 B2 * | 5/2007 | Johannesson et al. | ....... | 382/167 |

OTHER PUBLICATIONS

Sharma et al., "Color Imaging for Multimedia", IEEE vol. 86, No. 6, Jun. 1998, pp. 1088-1108.*
Patent Abstracts of Japan JP 10145805, publication date May 29, 1998.
Patent Abstracts of Japan JP 2002 330299, publication date Nov. 15, 2002.

* cited by examiner

*Primary Examiner*—Anh Hong Do
(74) *Attorney, Agent, or Firm*—Oblon, Spivak, McClelland, Maier & Neustadt, P.C.

(57) ABSTRACT

Digital image processing apparatus for applying pixel-based colour correction to a hue-saturation-based polar representation of pixels of an input image to generate an output image comprises colour correction logic arranged to provide a colour mapping operation defined by a hue alteration amount and a key value associated with each pixel; the colour correction logic comprising: hue modifying logic for adding a proportion of the hue alteration amount to the hue of each pixel of the input image, the proportion depending on the key value associated with that pixel; and saturation modifying logic for modifying the saturation of each pixel in dependence on the hue alteration amount and the key value for that pixel, such that for a key value indicating that only a fraction of the hue alteration amount should be applied to a current pixel, the saturation of that pixel is also modified so that, when expressed with respect to a rectangular chrominance-based colour space, the pixel is moved to a position in that colour space substantially lying on a straight line between the original pixel position and the position that the pixel would occupy if the full hue alteration amount were applied.

13 Claims, 11 Drawing Sheets

COLOUR CORRECTION

BACKGROUND OF THE INVENTION

1. Field of the Invention

This invention relates to colour correction.

2. Description of the Prior Art

Colour correction is a technique used in the production of image or video material to replace occurrences of certain colours in original material with corresponding replacement colours. Two examples of when this process might be needed are to match the appearance of scenes shot under different lighting conditions, or simply to change the appearance of an image for artistic reasons. Particularly in the context of this second example, it will be understood that the term "correction" does not imply that there was necessarily anything intrinsically wrong with the original colour; the way that the expression "colour correction" is used in the art (and in the present application) is in fact with the more generic meaning of "colour alteration".

The colour properties of an image are usually considered in one of the following representations, often referred to as "colour spaces": as a set of contributions from primary colours (e.g. RGB—red, green and blue), as a luminance value (L) plus two colour difference values (e.g. Cb, Cr) or as a luminance value (L), a hue value (H) and a saturation value (S). In real images (rather than test patterns) what is perceived as a "colour" does not correspond to a single point in colour space and so cannot generally be defined as a precise, single, set of such values. Instead, what the viewer may perceive as a single "colour" would typically occupy a range of values in colour space. For example, an image of, say, a red car would have a range of "red" values depending on the local lighting, angle and even cleanliness of each area of the car. So, in order to apply colour correction to the "red" of the car, in fact a region in colour space is defined to encompass all of the "red" colour exhibited by the car. A processing operation is then applied to map that source region to another similar (target) region elsewhere in colour space. By mapping the whole region in this way, variations in shade are mapped to corresponding variations in shade at the target region.

The colour correction may thus alter one or more of the colour properties of the image. For example, hue could be altered without changing the saturation and intensity values.

Colour correction is usually carried out in the digital domain. U.S. Pat. No. 6,434,266 discloses a digital colour correction system in which each pixel value of a source image is converted from an RGB representation into an HSL representation. The HSL values are compared—pixel by pixel—with a range of HSL values defined as a source range of "colours to be corrected". If a pixel is found to lie within the source range, that pixel is replaced by a pixel value in a "target" colour range.

The source range or locus in colour space may be associated with a "key". Where the key is full on (e.g. a value of one) the complete colour correction is applied. Where it is off (e.g. a value of zero), no correction is applied. In between these two extremes, the key can describe the amount of change to be applied. In this way, so-called soft edges may be produced at the periphery of the colour corrected regions of colour space.

In order to use the key value, the following example logic may be used. First, for the HSL position in colour space of a current pixel, the key value k is established. Then, for an additive change to luminance or saturation, the change is implemented as:

new value=old value+k·delta where delta is equal to the full amount of a desired change (i.e. the change which would occur where k=1).

The simple logic above works well to create additive delta changes in Luminance and Saturation. However, hue changes are more difficult. It is not possible to simply apply a hue change in the rectangular CbCr domain using a CbCr additive vector translation. Though this works for spot colour correction, it results in the wrong output value of saturation when larger regions of colour space are corrected.

Changes in hue are preferably applied using a rotation of the existing hue. When in the HSL domain this is a simple addition to the existing, input, hue. However, in soft areas (parts of colour space for which 0<k<1) undesirable colour "rainbow" effects are experienced, in that the hue rotation causes the transition to the new colour to pass through many similarly saturated additional colours. In soft areas it is more desirable for the softness to describe a straight line on the CbCr plane between the original and corrected colour. That is to say that in softness areas saturation changes as well as hue, in dependence on the key value.

So, there is a conflict of requirements. Where k=1, hue changes are better carried out in the HSL domain. However, where 0<k<1, i.e. in "soft" areas, hue changes are better carried out as a straight line translation in the CbCr domain. It is possible to overcome this conflict by producing the hardware needed to create a hue rotation, but operating in the Cb Cr domain, but this approach is very expensive in terms of processing overhead.

SUMMARY OF THE INVENTION

This invention provides digital image processing apparatus for applying pixel-based colour correction to a hue-saturation-based polar representation of pixels of an input image to generate an output image, the apparatus comprising:

colour correction logic arranged to provide a colour mapping operation defined by a hue alteration amount and a key value associated with each pixel;

the colour correction logic comprising:

hue modifying logic for adding a proportion of the hue alteration amount to the hue of each pixel of the input image, the proportion depending on the key value associated with that pixel; and saturation modifying logic for modifying the saturation of each pixel in dependence on the hue alteration amount and the key value for that pixel, such that for a key value indicating that only a fraction of the hue alteration amount should be applied to a current pixel, the saturation of that pixel is also modified so that, when expressed with respect to a rectangular chrominance-based colour space, the pixel is moved to a position in that colour space substantially lying on a straight line between the original pixel position and the position that the pixel would occupy if the full hue alteration amount were applied.

The invention provides a much more efficient smaller implementation by operating in the HSL domain, and changing saturation as well as hue, in softness areas, when a change to hue is being applied. This is conveniently realised using look-up-tables, because the equations that describe the hue and saturation deltas in soft areas are complex.

Various other respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

The embodiments to be described below may be implemented in hardware, in semi-programmable hardware (e.g. application specific integrated circuits or field programmable gate arrays), in software running on a general purpose data processing apparatus, or as any combination of the above. In the case of software-implemented features, the software may be stored in a storage medium (not shown) such as a disk storage medium, a read only memory or the like, and/or via a transmission medium such as an internet connection (not shown).

Figure 1:
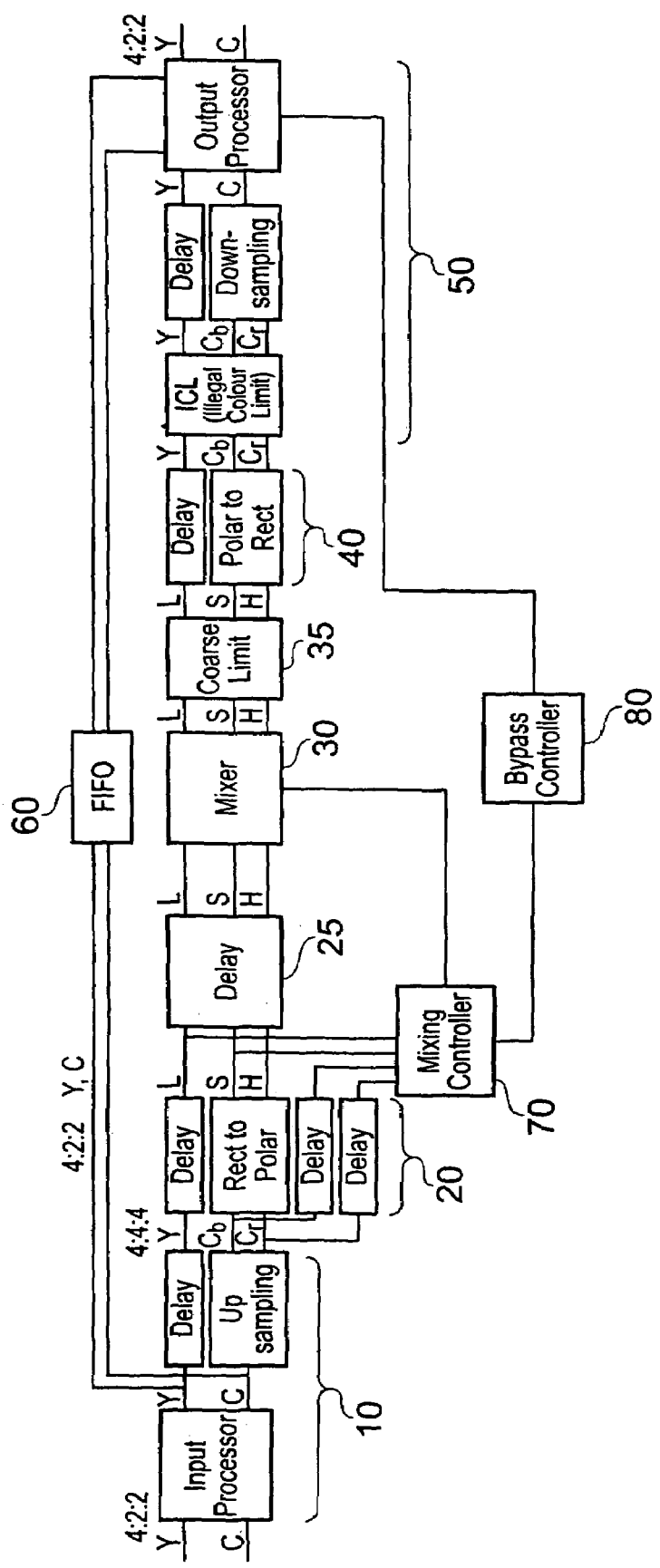
FIG. 1 is a schematic diagram of a colour correction system according to an embodiment of the present invention.

FIG. 1 is a schematic diagram of a colour correction system according to an embodiment of the present invention.

The colour correction system comprises an input processor 10, a pre-processor 20, a mixer arrangement 30, a post-processor 40, an output processor 50, a bypass buffer 60, a mixing controller 70 and a bypass controller 80.

Input video data is received by the input processor in a 4:2:2 Y,C (luminance, chrominance) format. The input processor routes the video data to the pre-processor 20 and also to the bypass buffer 60. The input processor also encompasses a stage of up-sampling of the chrominance components of the input video signal to a 4:4:4 Y,C format.

The pre-processor 20 carries out a rectangular to polar conversion of the chrominance components to give a (luminance, saturation, hue) (LSH) representation of the video. (Of course, the rectangular to polar conversion does not change the luminance, only the representation of the colour information). This is passed to the mixer arrangement 30 and to the mixing controller 70.

The mixing controller 70 is responsive to key parameters defining regions in colour space which are to be altered by the colour correction system. The mixing controller 70 detects whether the L,S,H values in respect of a current pixel lie within a region of colour space defined to be altered. The mixing controller generates a key value k defining whether the current pixel is to be altered and, in at least some embodiments, a degree to which alteration is to take place. The key value k is passed to the mixer arrangement 30.

The mixing controller 70 also passes information to the bypass controller 80 which, in effect, defines any pixels which have not been altered by the colour correction system. The bypass controller 80 generates a bypass control signal which is used by the output processor 50 to route the input (unaltered) data buffered in the bypass buffer 60 as output data in respect of those pixels where no alteration has been made. This means that the effect of filtering and other processors taking place at the input processor 10, the pre-processor 20, the mixer 30 and the post-processor 40 are not applied to any pixels where no alteration is in fact required.

Returning to the mixer arrangement 30, this receives the L,S,H values of a current pixel and a key value k in respect of that pixel. The key value controls the degree of alteration or colour correction processing applied to that pixel. An alteration is carried out in proportion to the key value. If k=0, then no alteration is made to that pixel. If k=1 then the full amount of a predetermined alteration is made. If 0<k<1 then a proportion of the predetermined alteration is made.

In FIG. 1, only a single stage of mixing controller 70 and mixer arrangement 30 is illustrated, but in a preferred embodiment six consecutive such stages are provided.

The post-processor 40 carries out a polar to rectangular conversion back to a 4:4:4 Y,C format along with a limiting function to remove any so-called "illegal" colours generated by the mixer arrangement 30. Illegal colours lie outside a range of colours deemed to be legal, which is generally is taken to be a range outside a so-called "colour cube".

Finally, the output processor 50 provides the bypass mixing function described above and also provides a down sampling function back to 4:2:2 Y,C format.

It will be seen from FIG. 1 that relative delays are applied to compensate for the processing delay of the up sampling, rectangular to polar conversion, polar to rectangular conversion and down sampling processors.

Figure 2:
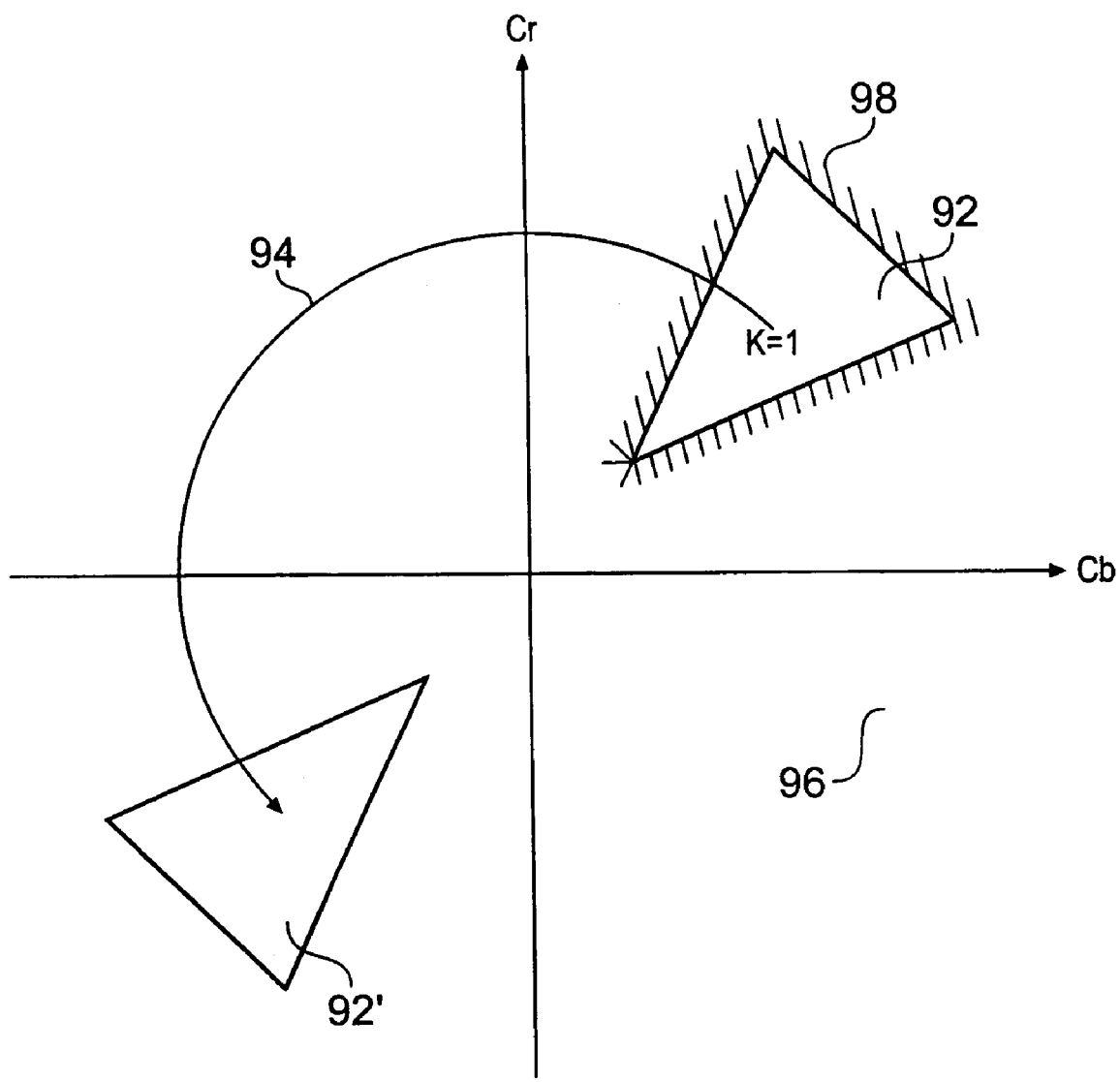
FIG. 2 schematically illustrates the use of soft regions in colour space.

FIG. 2 schematically illustrates the use of a key value k and so-called "soft" key values, to define a colour correction.

A region or locus 92 in colour space (e.g. a rectangular CrCb space) is defined so as to have a key value equal to a certain amount (e.g. a maximum key value, which in the present embodiment will be taken as being equal to 1). Well away form that region, for example at a position 96, the key value is set to another predetermined amount, such as zero. A colour alteration 94 is defined in respect of that keyed region. This maps the region 92 onto a corresponding region 92'.

Now, for a current pixel, the colour attributes (Cb, Cr in this case) of that pixel are compared with the keyed region. If the attributes of the current pixel are found to lie within the keyed region, then the alteration 94 is applied to that pixel. If the key value is zero for that current pixel, then no colour correction change is applied.

However, it is possible to set a key value which represents neither "a full change" nor "no change at all". In the present embodiment this is achieved by using a key value of greater than zero but less than one. Regions 98 having a key value k where 0<k<1 are referred to as "soft" regions and are shown schematically as shaded regions in FIG. 2.

In a soft region, a partial colour correction operation is carried out. That is to say, a part of the alteration 94 is applied to a pixel having colour attributes corresponding to a soft region. The amount or proportion of the transition may conveniently be set so as to be proportional to the key value.

The problem of how to handle a partial colour transition is discussed extensively in the following description.

Figure 3:
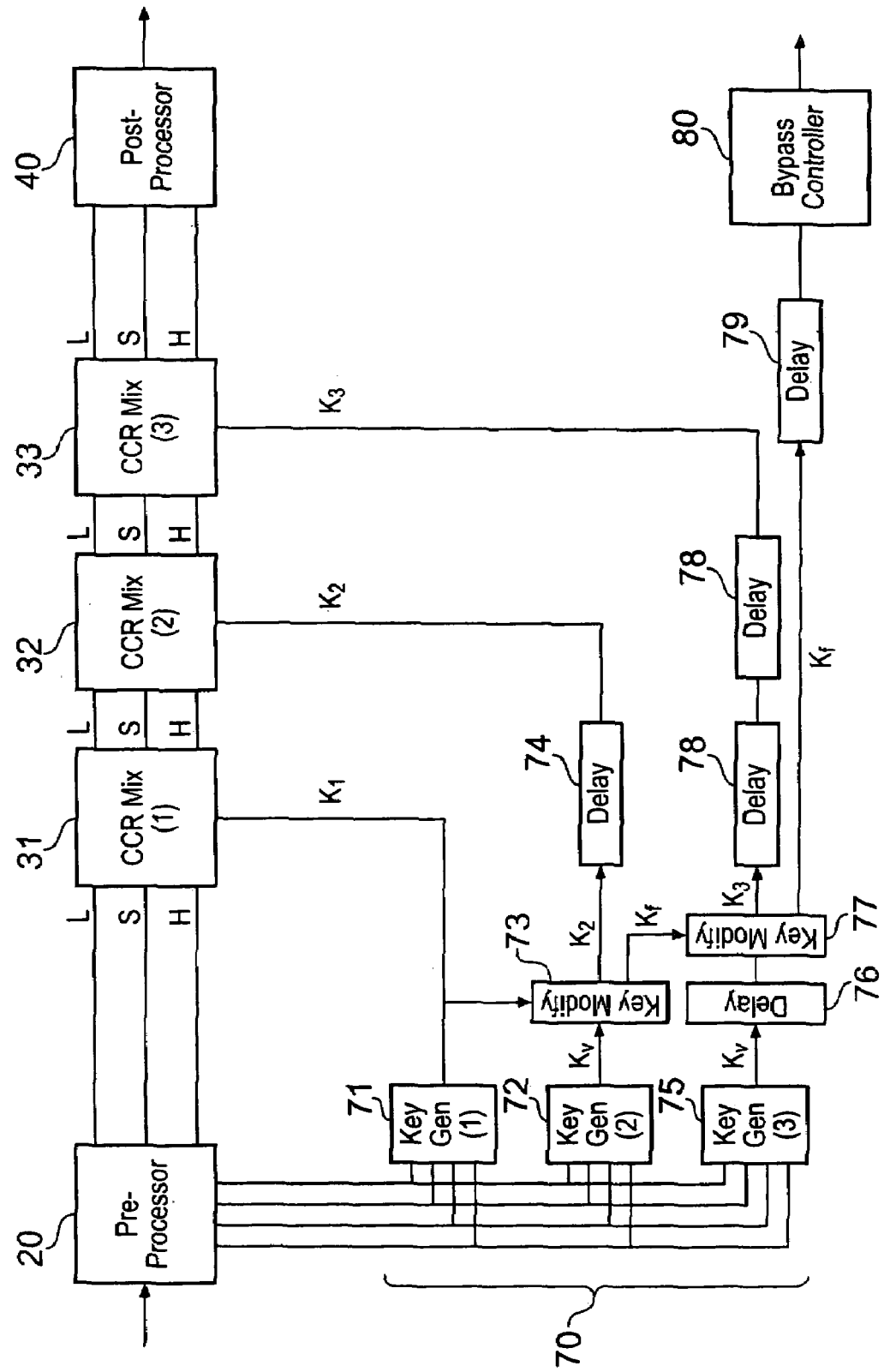
FIG. 3 schematically illustrates a mixing arrangement.

FIG. 3 schematically illustrates a mixing and mixing control arrangement.

A succession of mixers 31, 32, 33 . . . are used. In actual fact, six such mixers are used, with the output of a mixer forming the input to a next mixer in the sequence. Each mixer uses a respective key signal $k_1$, $k_2$, $k_3$ . . . .

The key signal $k_1$ for the first mixer 31 is generated by a first key generator 71. Similarly, a key signal $k_v$ for the second mixer is generated by a second key generator 72. The key signal from the first key generator and the key signal from the second key generator are supplied to key modifying logic 73. This generates two outputs: one is the key $k_2$ which is actually used to control the second mixer, and another is $k_f$—effectively a "running total" key amount—which is passed to a next stage of key modifying logic in the sequence. The key $k_2$ is delayed by a delay 74 so as to arrive at the second mixer 32 at the same time as the (potentially modified) pixel data to which it refers.

Continuing down the chain, a third key generator 75 supplies a key $k_v$ via a compensation delay 76, to a second key modifying logic 77, which also receives a running total key value $k_f$ from the key modifying logic of the preceding stage. This outputs a key $k_3$ which, via delays 78, is supplied to the third mixer 33.

The basic principle underlying the key generation and key modifying logic is that a position in colour space which has been modified by an earlier mixing operation in the sequence of mixing operations should not be modified again. So, if a key value of 1 (complete alteration) has been generated by an earlier key generator in respect of that position in colour space, later key generators are inhibited from generating a non-zero key value in respect of the same colour space position. If a key value representing a partial modification has been generated in respect of a particular position in colour space, then a further partial modification is allowed to be passed to the key modifying logic. The "running total" key, $k_f$, represents the total amount of modification applied to that pixel by preceding key generators in the sequence. So, if the first key generator had generated a key value of, say, 0.2 in respect of a current pixel, and the second key generator had generated a key value of, say, 0.1 in respect of that pixel, then the running total key value $k_f$ passed to the third key generation stage would be 0.3. The maximum key value $k_3$ which could be passed by the key modifying logic of the third stage would then be (1−0.3)=0.7.

As mentioned above, it is preferred that a succession of six mixers with corresponding key generation is provided, but for clarity of the diagram, FIG. 3 shows only three stages of the mixing process. Accordingly, in a final stage, the key modifying logic 77 outputs a key $k_f$ which provides an input (via a delay 79) to the bypass controller 80.

Figure 4:
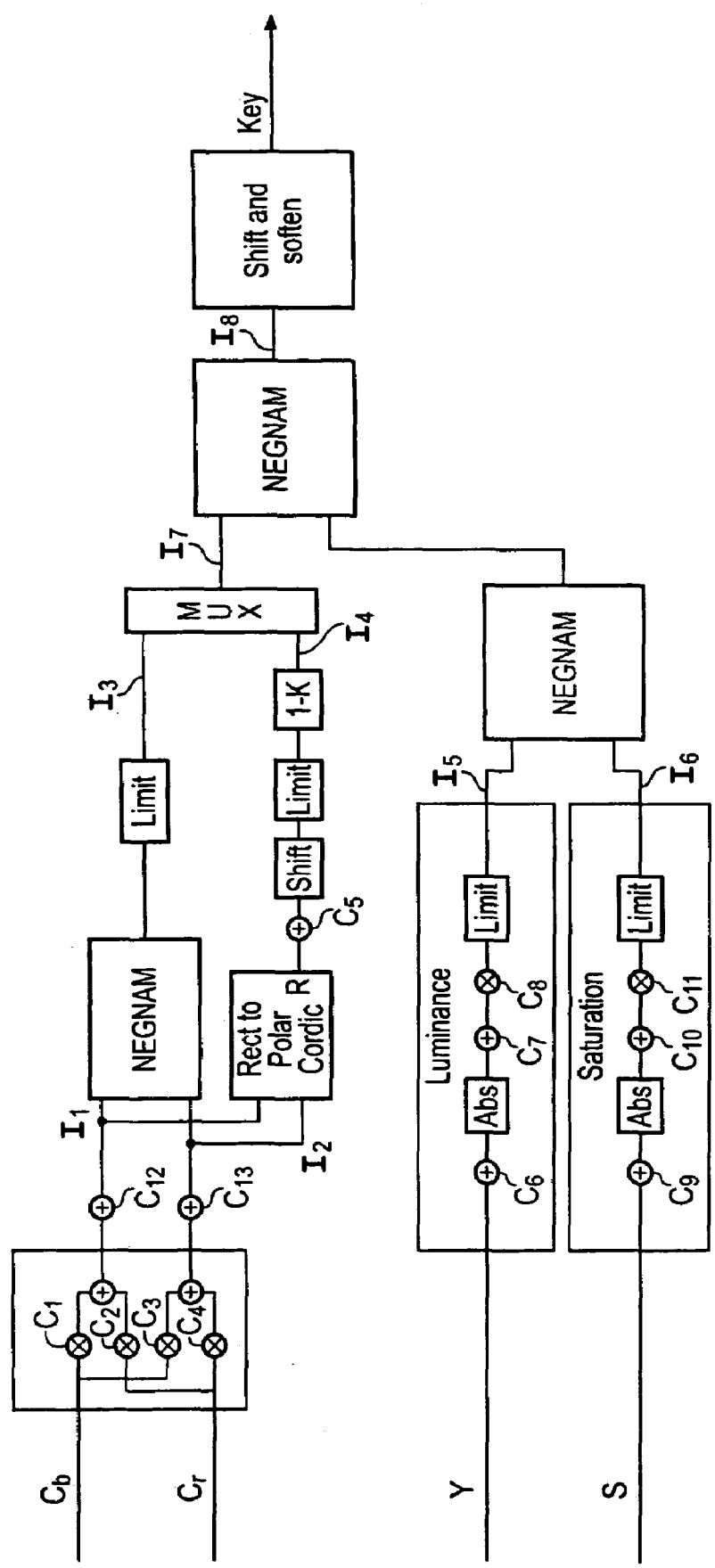
FIG. 4 schematically illustrates a key generator arrangement.

FIG. 4 schematically illustrates a key generator such as the key generator 71, 72 or 75.

The key generator receives luminance (Y) chrominance ($C_b$, $C_r$) and saturation (S) data in respect of a current pixel. A key value $k_v$ is generated in dependence on these attributes of the current pixel and on 13 constants $C_1$ . . . $C_{13}$. Considering the operation of FIG. 4 in terms of some intermediate values $I_1$ . . . $I_8$, it can be seen that:

$I_1 = C_{12} + (C_1 * Cb) + (C_2 * Cr)$
$I_2 = C_{13} + (C_3 * Cb) + (C_4 * Cr)$

The outputs $I_1$ and $I_2$ represent a rotation of the hue of the pixel.

An operation referred to as "NEGNAM" (negative non additive multiplexing) signifies that the numerically lower of the inputs to the NEGNAM is passed as its output. So:

$I_3$=the lower of $I_1$ and $I_2$, subject to a limiting operation to prevent overflow.

$I_4 = 1 - (C_5 + \sqrt{(I_1^2 + I_2^2)})$, subject to a shift operation and a limiting operation. The reason for the shift operation is as follows. To avoid unnecessary processing overheads, the gain that needs to be applied using $C_1$ to $C_4$ is split into two parts, a fractional component and a power-of-two component. The fractional component is applied by the multiplication by $C_1$ . . . $C_4$, and the power-of-two component is applied as a bit shift.

$I_5 = C_8 * (ABS(Y + C_6) + C_7)$ subject to a limiting operation to prevent overflow $I_6 = C_{11} * (ABS(S + C_9) + C_{10})$ again subject to a limiting operation to prevent overflow Here, $I_5$ may be considered as a luminance key and $I_6$ as a saturation key.

$I_7$=either $I_3$ or $I_4$, depending on whether operation is in a "sector mode", so that the keyed region represents a sector in colour space, or "ellipse mode" in which the keyed region represents an elliptical region in colour space. $I_3$ is selected in sector mode and $I_4$ is selected in ellipse mode.

$I_8$=the lower of ($I_7$ and the lower of ($I_5$ and $I_6$))

The value $I_8$ is then "shifted and softened" to form the key value $k_v$. The shifting and softening operation allows modification of the key edges to better align them to the boundary of the region being corrected.

Figure 5:
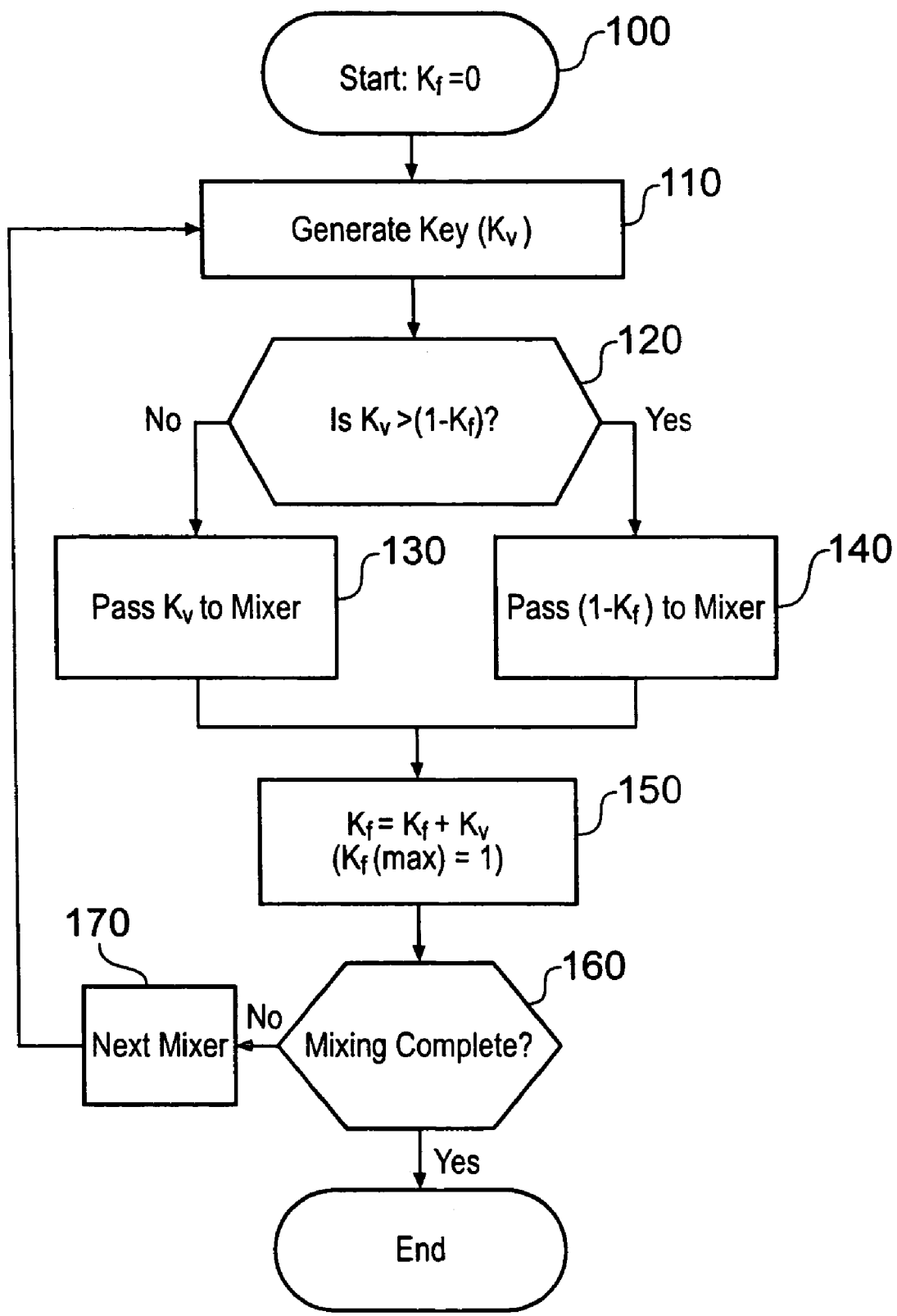
FIG. 5 is a schematic flow chart showing a key priority process.

FIG. 5 schematically illustrates the process used to handle the running total key values kf and the newly generated key values $k_v$. In the present embodiment the process is carried out in hardware, but the flowchart of FIG. 5 schematically illustrates how the process may be carried out if the key modifying logic referred to above is implemented as programmable data processing apparatus, running a program stored on a storage medium such as a read only memory or a disk storage medium, or received via a network connection such as an internet connection.

At a start 100, the running total key value, $k_f$, for a current pixel is set to zero. At a step 110, the first key generator 71 generates the first key value kv. At a step 120, a comparison is made between kv and (1−$k_f$). If $k_v$>(1−$k_f$) then (1−$k_f$)—the remaining amount of key available at that pixel—is passed 140 to the mixer 31. Otherwise (as would be the case for the first key generation stage) if (1−$k_f$)>=$k_v$, then $k_v$ is passed 130 in full to the mixer 31.

At a step 150 the running total key $k_f$ is increased by the amount of $k_v$, subject to a maximum value for $k_f$ of 1.

If at a step 160, it is found that the sequence of mixing operations is complete, the process ends. Otherwise, at a step 170, the process returns to operate in respect of the next key generation step.

The following table illustrates the operation in respect of the running total key $k_f$ and a newly generated key value $k_v$.

| Input to key modifying logic | | Output from key modifying logic | |
| --- | --- | --- | --- |
| $K_f$ | $K_v$ | $K_f$ | $K_v$ |
| 1 | 1 | 1 | 0 |
| 0 | 1 | 1 | 1 |

-continued

| Input to key modifying logic | | Output from key modifying logic | |
|---|---|---|---|
| $K_f$ | $K_v$ | $K_f$ | $K_v$ |
| 1 | 0 | 1 | 0 |
| 0 | 0 | 0 | 0 |
| 0.5 | 1 | 1 | 0.5 |
| 0.2 | 0.3 | 0.5 | 0.3 |
| 0.7 | 0.9 | 1 | 0.3 |

Figure 6:
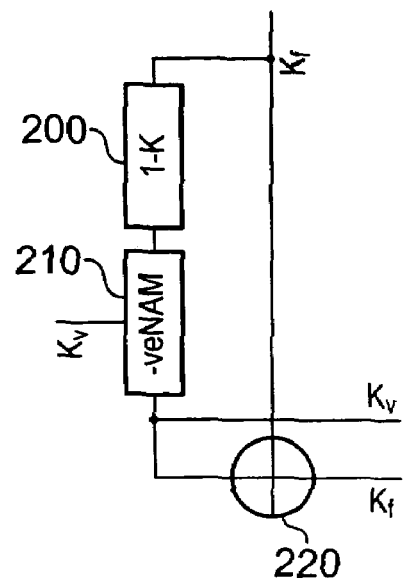
FIG. 6 schematically illustrates a first embodiment of a key modifier.

FIG. 6 schematically illustrates a hardware implementation of the key modifying logic 73, 77 . . . .

The value $k_f$ is supplied in parallel to a subtractor 200, which generates a value $(1-k_f)$, and an adder 220.

The value $(1-k_f)$ is passed from the subtractor 200 to a NEGNAM 210, which receives as a second input the newly generated key value kv. The NEGNAM 210 outputs the lower of $k_v$ and $(1-k_f)$ as the current key to be used by the current mixing arrangement. The output of the NEGNAM 210 is also passed to the adder 220, where it is added to the existing $k_f$ to form the new running total key value $k_f$.

Figure 7:
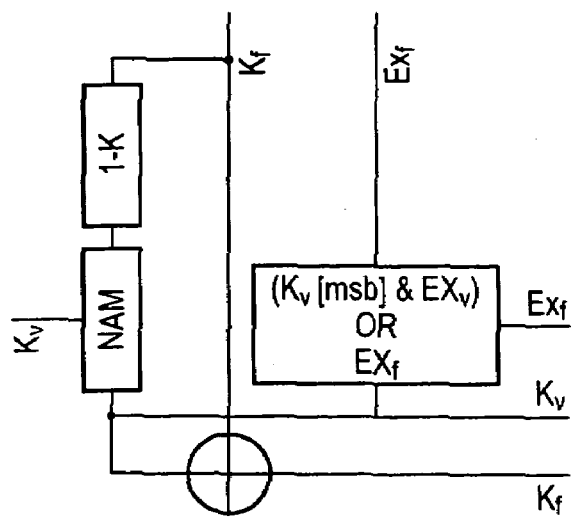
FIG. 7 schematically illustrates a second embodiment of a key modifier.

FIG. 7 schematically illustrates a second embodiment of the key modifying logic which also handles a "running total" bypass value $E_{xf}$.

As mentioned above, to ensure that the colour corrector is transparent to pixels for which no change is made, the final running total key value, $k_f$, may be used to derive a control signal for the bypass function. So, if a pixel has been modified to any extent by any of the mixing stages (i.e. if $k_f>0$ for that pixel) then the output of the sequence of mixing arrangements is used as the output pixel. If, however, $k_f=0$ for that pixel, this shows that the pixel has not been modified by the colour correction process, and so the bypass (buffered) value of the original pixel is used as the output pixel.

An exception can occur in the following circumstances. It is possible to use one of the earlier stages in the sequence of mixing arrangements to exclude certain regions of colour space from any modification at all. This is done by deriving a key in respect of that region but setting the parameters controlling the corresponding mixing arrangement to provide a zero change. Because of the use of key modifying logic and the running total key, $k_f$, as described above, this will have the effect of inhibiting any subsequent change at that region of colour space by following mixing arrangements in the sequence.

Using the basic "bypass" method based on $k_f$ alone, such "excluded" pixels corresponding to the excluded region of colour space will be output from the chain of mixing arrangements rather than from the bypass buffer. But as the pixels corresponding to that region of colour space will not have been modified, it would be more appropriate to use the buffered pixels as output.

Referring to FIG. 7, a running total exclude flag $E_{xf}$ is derived, at each stage, by an OR operation between the previous value of Exf and an AND combination of $k_v$ (the key value output by the current key modifying logic and used to control the current mixing arrangement) and a flag $E_{xv}$ (a flag set high when the current key generator is in an "exclude" mode of operation).

Using this arrangement, a key generator set to exclude mode will set $E_{xf}$ high if the current pixel has its key value's MSB set to 1 by that key generator. The logic implies that Exf, once set high, cannot be set low by a subsequent key modifying logic stage.

Figure 8:
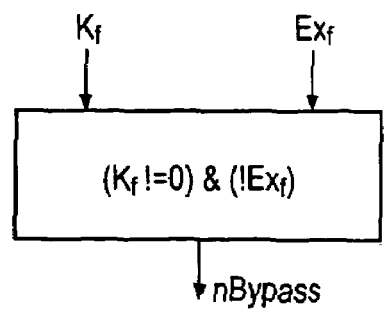
FIG. 8 schematically illustrates a bypass controller.

FIG. 8 schematically illustrates a bypass controller. The bypass controller receives as inputs the running total key value $k_f$ and the running total exclude flag $E_{xf}$. A bypass control output is generated as:

nbypass=($k_f$ doesn't equal zero) AND (NOT $E_{xf}$)

If the key is non-zero and the exclude flag has not been set, then the bypass (buffered) pixel is not to be selected.

Figure 9:
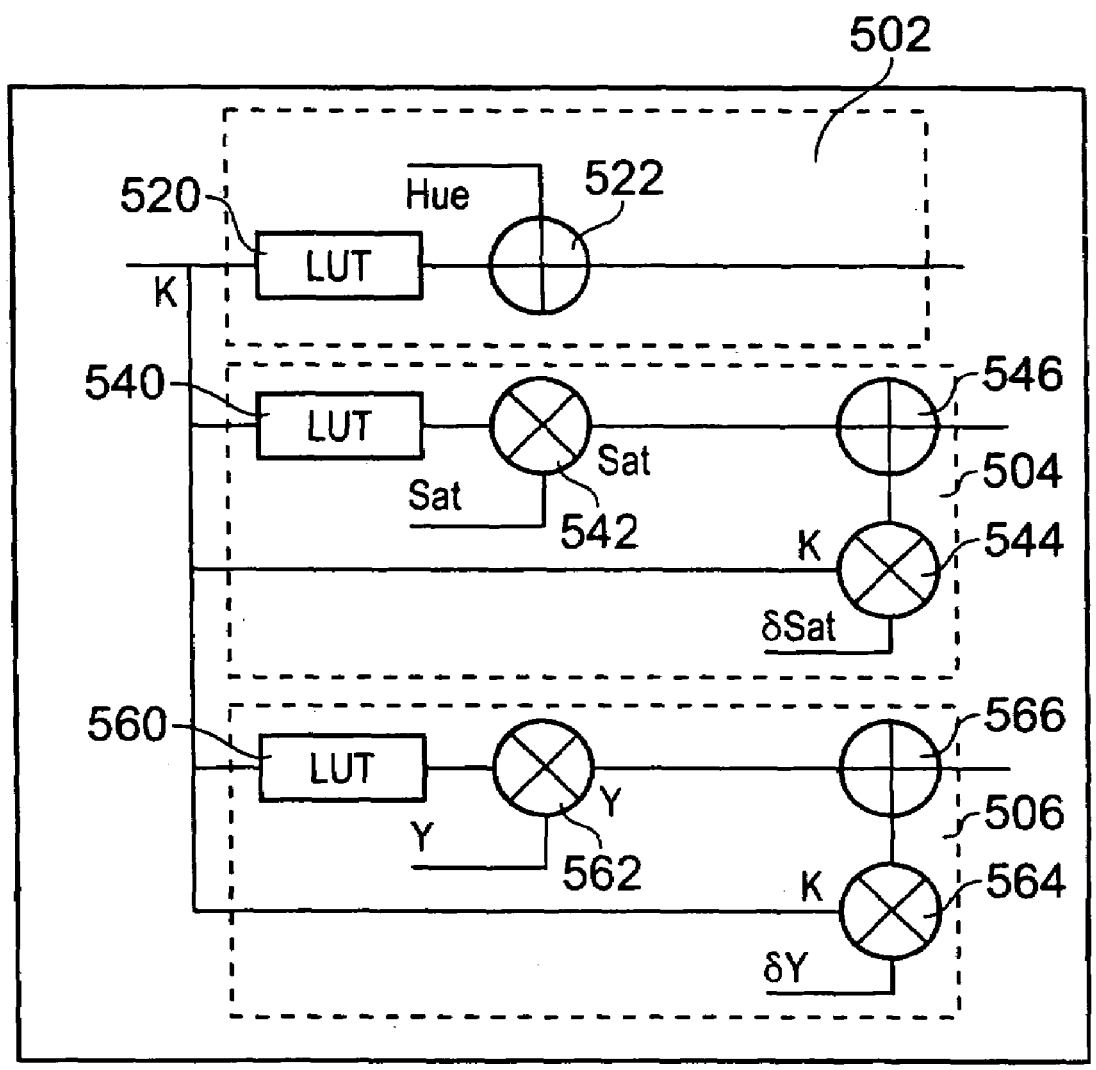
FIG. 9 is a schematic diagram of a mixing arrangement.

FIG. 9 is a detailed schematic diagram of part of the mixing arrangement 30 shown in FIG. 1. The mixing arrangement 30 comprises colour correction logic operable to effect desired additive changes to hue, saturation and luminance and multiplicative changes to saturation and luminance. The mixing arrangement logic operates in the polar domain.

The mixing arrangement has as its inputs initial values for hue, saturation and luminance from the pre-processor 20, as well as a key value k from the mixing controller 70 (which defines whether the current pixel is colour corrected, and if so, by how much) and also desired modifiers including additive deltas for hue, saturation and luminance, and gain for saturation and luminance.

Hue modification is carried out by logic 502. The logic 502 relates only to additive changes (shifts) in hue. The logic 502 comprises a look-up table (LUT) 520 which tabulates the equations required in providing a smooth colour transition in soft regions of colour space (regions for which 0<k<1). It is noted that a smooth colour transition between initial and desired hue through soft areas of colour space requires a change in saturation as well as hue in the polar domain. This is discussed later with reference to FIGS. 10a, 10b, 11a, 11b and 12. The contents of the look-up table 520 are described later with reference to FIGS. 14 and 15. The look-up table 520 takes the key value k as an input and produces an output to be summed with the input hue by an associated adder 522. This generates an output hue.

Saturation modification is carried out by logic 504. The saturation logic relates to both additive (shift) changes and multiplicative (gain) changes. As noted above, smooth transitions between input and desired hues also require modification to saturation in soft regions, and so these changes are implemented also within the saturation logic 504.

The logic 504 comprises a look-up table 540 which provides multiplicative changes to saturation, to operate with the hue changes described above to provide a smooth alteration in soft regions. The look-up table 540 takes the key value k as an input and produces an output to be passed to a multiplier 542 to be multiplied by the input saturation. The result of the multiplicative operation is then passed to an adder 546 to be summed with the result of any desired additive modifications. The desired additive saturation change δSat is taken as an input to multiplier 544. The second input to the multiplier 544 is key value k. δSat and k are multiplied together by multiplier 544 and the result is passed as an input to the adder 546 to be summed with the output of the multiplier 542. The sum of the additive and multiplicative modifications to saturation results in an output saturation.

Luminance modification is carried out by logic 506. The luminance logic relates to both additive (shift) changes and multiplicative (gain) changes. The logic 506 operates in a similar way to the saturation logic 504, apart from different look-up table data.

The logic 506 comprises a look-up table 560, which provides multiplicative changes to luminance, to operate with the hue changes described above to provide a smooth alteration in soft regions. The content of the table is considered later with reference to FIG. 16. The look-up table 560 takes the key value k as an input and produces an output to be passed to a multiplier 562 to be multiplied with the input luminance. The result of the multiplicative operation is then passed to an adder 566 to be summed with the result of any desired additive modifications. The desired additive luminance change δY is taken as an input to multiplier 564. The second input to multiplier 564 is key value k. δY and k are multiplied together by the multiplier 564 and the product is passed as an input to an adder 566 to be summed with the result of the above described multiplicative modifications. The summation of the additive and multiplicative modifiers results in an output luminance.

The output hue, saturation and luminance are then passed on to the next mixing arrangement in the sequence or, in the case of the last mixing arrangement, to the post processor 40.

The look-up tables may be supplied with data once per field, once per frame etc. The data may be supplied by data generating means (not shown) within the mixing arrangement or by an external data processing apparatus (not shown)

Part of the reason for using the look-up tables for hue modification will now be described. In basic terms, it has been recognised that it is not possible to simply apply a hue change in the Cb,Cr domain using a deltaCb and deltaCr additive vector translation. The reasons behind this will now be explained.

Simple additive logic works well to create additive delta changes in Luminance and Saturation, but hue is more complicated. Hue can be considered in either the polar or the rectangular (Cb,Cr) domains.

Figure 10A:
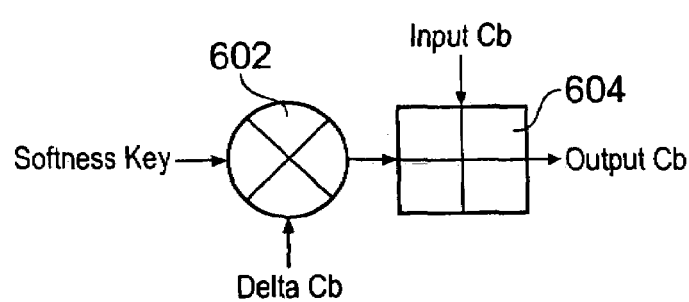
FIGS. 10a and 10b are schematic diagrams illustrating problems with hue rotation in a rectangular domain.
Figure 10B:
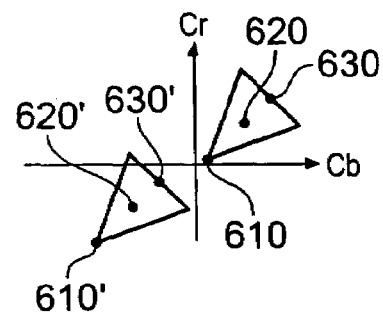

FIG. 10a schematically shows a simple additive logic applied to try to create a hue shift in the rectangular domain. Though this works for spot colour correction, that is, correction or alteration of colours represented by single points in colour space, it can result in the wrong output value of saturation when larger regions of colour space are corrected. (Here, it is noted that what a viewer may perceive as a single "colour" would normally occupy a region in colour space). Referring to FIG. 10b, it can be seen that if an additive correction amount is set up in the rectangular domain which is correct for, say, a spot colour 620 (mapping it to a corresponding colour 620'), such a correction will normally be quite inappropriate for other spot colours in the same colour region, such as a colour 610 (mapped to a corrected colour 610') and a colour 630 (mapped to a corrected colour 630'). The saturation of the colours 610' and 630' will be very different to the saturation of the input colours 610 and 630.

Figure 11A:
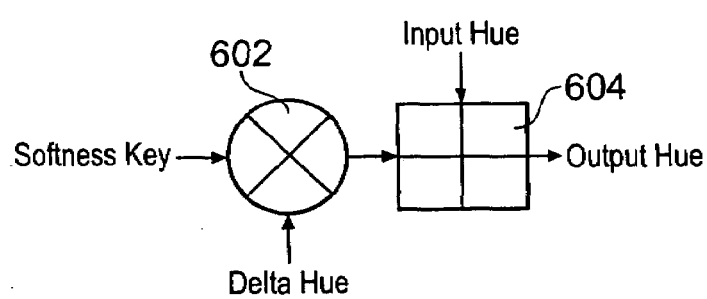
FIGS. 11a and 11b are schematic diagrams illustrating hue rotation in a polar domain.
Figure 11B:
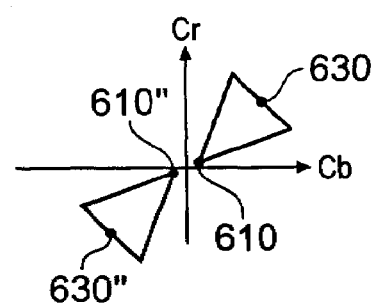

This problem can be alleviated by operating in the hue (polar) domain. FIG. 11a schematically shows a simple additive logic applied to hue shift in the polar domain. Here, a change in hue represents a rotation in the rectangular domain. This maintains the correct saturation for different positions within a region of colour space—for example, the colour 610 is correctly mapped to the colour 610", and the colour 630 is now correctly mapped to the colour 630".

However, operating in the polar domain can introduce other problems. In particular, in "soft" regions (where 0<k<1) of colour correction, which typically are set up so as to occur around the edges of regions to be corrected, undesirable colour "rainbow" effects may be experienced. The reason for this will now be explained with reference to FIG. 12.

Figure 12:
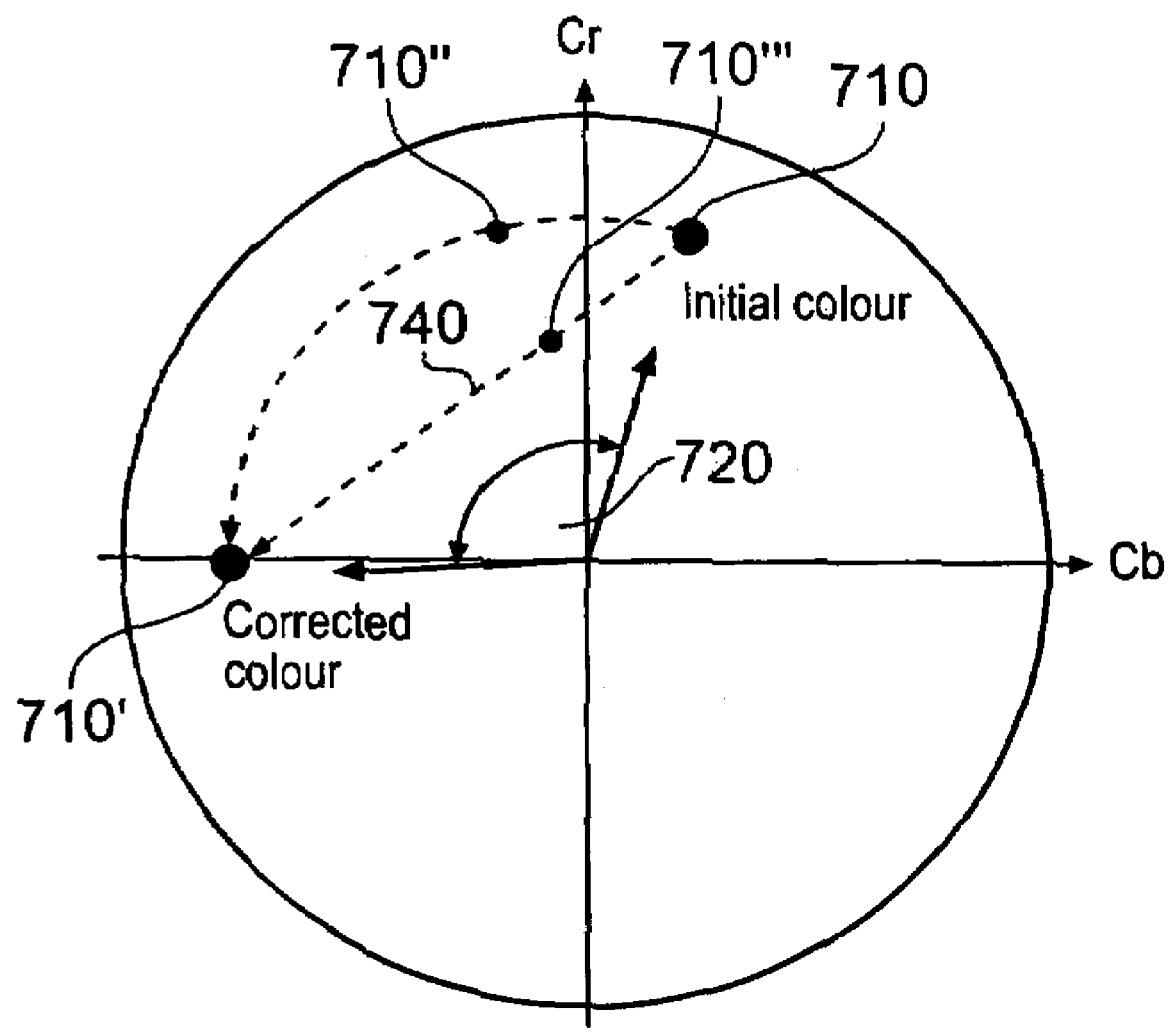
FIG. 12 is a schematic diagram illustrating hue rotation in a soft region.

FIG. 12 schematically shows a hue shift represented in the polar domain. The hue shift can be most easily described as a hue rotation by an angle 720, so that (for example) an input colour 710 is altered to a corrected colour 710'.

In a basic arrangement using a hue rotation implemented in the polar domain, a correction in a "soft" region (where 0<k<1) would result in a partial rotation by an angle given by:

hue rotation=k·(angle 720)

So, for a key value k of, say, 0.3, a rotation of the colour 710 to a corrected colour 710" would occur. This represents a rotation by an angle equal to 30% of the angle 720.

However, in soft areas it is more subjectively desirable for the partial correction to describe a straight line 740 on the Cb,Cr plane between the original and corrected colour. So, for a key value k of 0.3, it is more subjectively desirable for the colour 710 to be altered to give a corrected colour 710'''.

This means however, that in softness areas saturation will change as well as hue (saturation being represented by the distance from the origin to the line 740).

Figure 13:
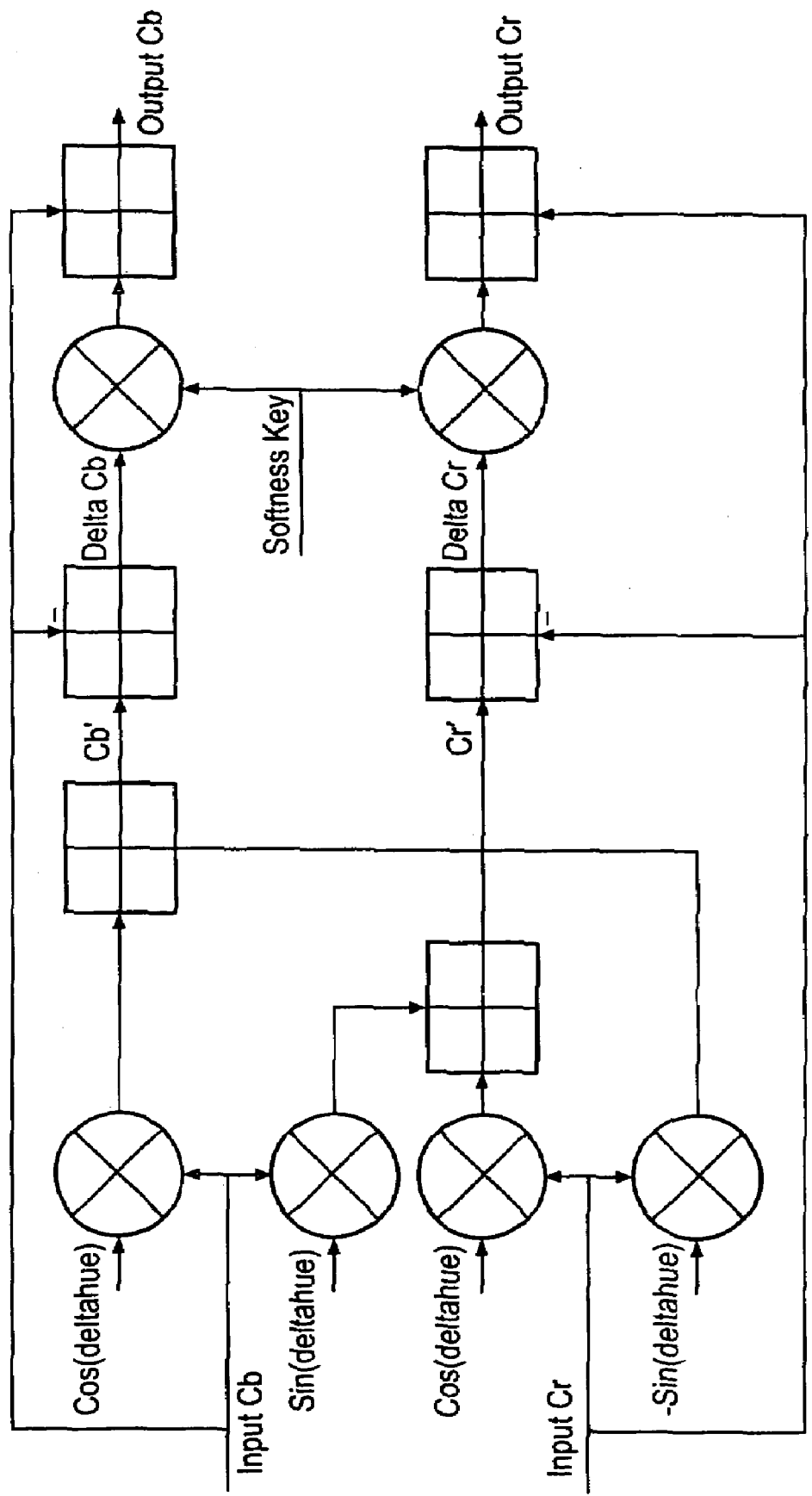
FIG. 13 is a schematic diagram illustrating a possible implementation of hue rotation in the rectangular domain.

It is possible to implement this by producing the hardware needed to create a rotation, but operating in the rectangular (Cb,Cr) domain, but this is undesirable because a lot of hardware is required. A possible logic arrangement suitable for carrying out this rotation in the rectangular domain is shown schematically in FIG. 13. This involves the calculation of sines and cosines of the desired hue change, and generally is very expensive in terms of hardware or processing operations. In contrast, the present embodiment provides an elegantly simpler technique which is much less expensive of hardware or processing operations.

As described above, when hue alterations are implemented in the polar domain, it is subjectively desirable to change saturation as well as hue, when a hue change is being applied and 0<k<1. This can conveniently be realised using look-up tables, because the equations that describe the hue and saturation deltas in soft areas are complex.

Figure 14:
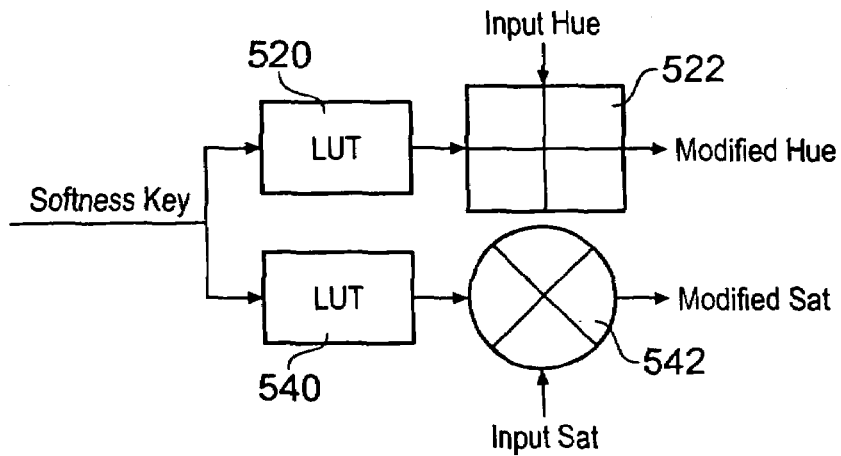
FIG. 14 schematically illustrates hue rotation in the polar domain.

FIG. 14 schematically illustrates those parts of the arrangement of FIG. 9 which are relevant to hue modification in soft regions. The look-up tables 520 provides alteration values required for a shift in hue, and the look-up table 540 provides alteration values required for a change in saturation. Both look-up tables take the key value key as an input. The equations from which the look-up table values (for both saturation and hue) are generated are considered below with reference to FIG. 15. Note that the modified saturation shown in FIG. 14 is not necessarily the final output saturation, as it may still be modified by any desired direct changes to the gain or delta of the original saturation.

The hue look-up table is used to alter the hue in a fashion to ensure that there is a linear transition along the line 740 with respect to the changing key value.

Figure 15:
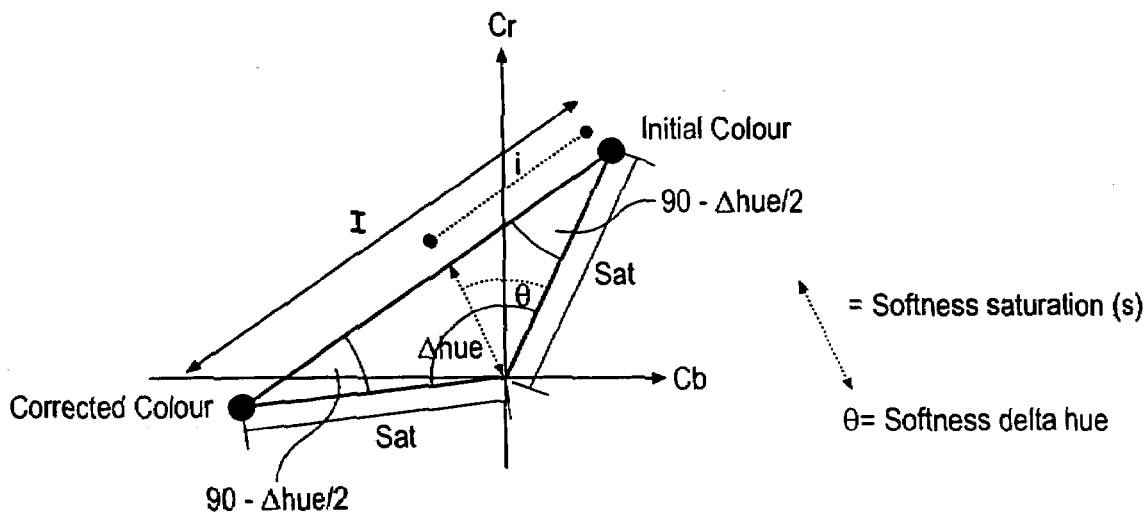
FIG. 15 schematically illustrates the derivation of look-up table values.

The contents of the two look-up tables of FIG. 14 can be generated using the geometry shown in FIG. 15 and known trigonometrical identities. FIG. 15 schematically illustrates a colour correction operation in the rectangular (Cb,Cr) domain. In FIG. 15:

The variable "I" represents the total change that is caused by the colour correction operation, i.e. when k=1.

The variable "Δhue" represents the total hue rotation that is caused by the colour correction operation, i.e. when k=1.

The variable "i" represents an incremental (vector) change caused by a partial value of k, i.e. a value for which 0<k<1.

The variable "s" represents the desired saturation in the situation that 0<k<1.

The variable "θ" represents the hue change (rotation) which is required when 0<k<1.

The variable "Sat" represents the saturation of a current pixel.

To ensure that as the key value increases a straight-line transition will be made from the initial colour to the corrected colour in the rectangular domain, it is necessary to use:

$$i = I \cdot k$$

To obtain the saturation look-up table 840, the following equations are required:

$$\frac{s}{\operatorname{Sin}(90 - \Delta hue/2)} = \frac{\operatorname{Sat}}{\operatorname{Sin}(180 - \theta - (90 - \Delta hue/2))}.$$

$$s = \operatorname{Sat} * \frac{\operatorname{Cos}(\Delta hue/2)}{\operatorname{Cos}(\Delta hue/2 - \theta)}.$$

So, the contents of the saturation look-up table are defined by:

$$\frac{\operatorname{Cos}(\Delta hue/2)}{\operatorname{Cos}(\Delta hue/2 - \theta)}.$$

and this value is multiplied by the current pixel's saturation, Sat. The input to the look-up table appears to be the angle θ, but this is in fact a function of the incoming key value k, which will now be shown in relation to the generation of the hue look-up table 820.

For the hue look-up table 820, the following equations are required:

$$\frac{I}{\operatorname{Sin}(\Delta hue)} = \frac{\operatorname{Sat}}{\operatorname{Sin}(90 - \Delta hue/2)}. \quad (1)$$

$$\frac{i}{\operatorname{Sin}(\theta)} = \frac{\operatorname{Sat}}{\operatorname{Sin}(180 - \theta - 90 + \Delta hue/2)}. \quad (2)$$

Substituting 1 and 2 into the above, and solving for tan(θ), gives:

$$\frac{1}{\frac{1}{k * \operatorname{Sin}(\Delta hue)} - \tan(\Delta hue/2)} = \tan(\theta)$$

This means that the angle θ is the arctangent of the left hand side of the equation above. It is this that is used in the hue look-up table 820, with key value k as the input and the angle θ as the output. This output angle θ is then added into the input hue angle to create the modified hue.

This equation is also used to relate k to the angle θ for use with the saturation look-up table 840. This means that the input for the saturation look-up table can be k.

Because tangent is not a continuous function, and because it is important to prevent divide-by-zero errors, some exceptions are needed in the firmware that calculates the look-up table contents. These exceptions are:
(a) k=0
(b) k=1
(c)

$$\frac{1}{k * \operatorname{Sin}(\Delta hue)} - \tan(\Delta hue/2) = 0$$

(d) Δhue>=180 degrees

These exceptions can be handled using the following procedures:
(i) if Δhue<−180 degrees, add 360 degrees to Δhue
(ii) if Δhue>180 degrees, subtract 360 degrees from Δhue
(iii) if the absolute value of Δhue>179.9 degrees (i.e. nearly 180 degrees) then:
   if k<0.5, set the look-up table (LUT) value of hue change to zero and the saturation LUT value to (1−2 k);
   otherwise (i.e. if k>=0.5) set the LUT value of hue change to Δhue and the saturation LUT value to (2 k−1)
(iv) if k=0 then set the LUT value of hue change to 0 and the saturation LUT value to 1; else if k is exactly equal to 1, set the LUT value of hue change to Δhue and the saturation LUT value to 1.

$$\text{when } \frac{1}{K * \operatorname{Sin}(\Delta hue)} - \tan(\Delta hue/2) = x = 0 \quad (v)$$

the hue LUT value should be set to 90°. However, when x, above, is nearly equal to zero (i.e. within a predetermined amount, SMALLNUMBER, of zero), the hue look-up table should also be set to 90°.

The present embodiment uses a 10-bit hue value. This implies that 360 degrees of hue rotation corresponds to a hue change of decimal 1024. So, the smallest number of degrees of hue change is represented by 1/1024.

This means that the closest distinction that can be made between 90 degrees and the next number of degrees is: 90−(360/1024)=89.6484375.

The tangent of this is 162.9726164.

Finally, 1/x is required to give: x=0.00613600158=SMALLNUMBER.

Using the above criteria and exceptions, it is possible to construct look-up tables for hue and saturation which provide accurate values for a linear transition across the rectangular domain, allowing the operation of the logic itself to take place in the polar domain.

The previous logic works to provide an additive change. However, it is also advantageous to create a multiplicative delta, as implemented in the logic of FIG. 9.

Figure 16:
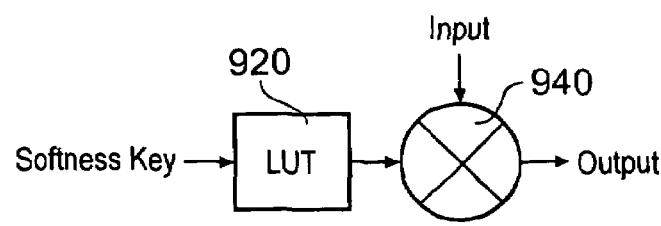
FIG. 16 schematically illustrates the use of a look-up table for luminance modification.

FIG. 16 illustrates the logic required to provide a multiplicative change to saturation and luminance. This is only applicable to saturation and luminance—as discussed above multiplicative changes are not relevant to hue. To save on multipliers these changes are implemented using a look-up table 920 and a multiplier 940. From FIG. 16 it can be seen that the appropriate value of the look-up table 920 is applied to the multiplier 940 to be multiplied together with the input to provide the appropriate output. The gain in both cases is embodied in the values of the look-up table. In the case of saturation, the gain is applied by multiplying the contents of the look-up table 920 with the desired gain (except for K=0 which is left with unity gain for when the key is off) and applying the appropriate look-up table value to multiplier 940 to be multiplied together with the input saturation. The output of the multiplier 940 being the modified saturation. Note that in this case of saturation, the look-up table 920 and the multiplier 940 are embodied in FIG. 9 as look-up table 540 and multiplier 542. The look-up table for saturation has the dual purpose of providing for desired saturation gain and hue-related saturation modification.

In the case of luminance, the content of the look-up table 920 is described by the equation:

$$1 + k * (\text{Desired luminance gain} - 1)$$

The look-up table 920 then takes key value k as an input and produces an output to be applied to the multiplier 940 and thus multiplied together with the input luminance to provide the modified luminance. For luminance, the look-up table 920 and the multiplier 940 are embodied in FIG. 9 as look-up table 560 and multiplier 562.

In so far as the embodiments of the invention described above are implemented, at least in part, using software-controlled data processing apparatus, it will be appreciated that a computer program providing such software control and a storage or transmission medium by which such a computer program is provided are envisaged as aspects of the present invention.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Digital image processing apparatus for applying pixel-based colour correction to a hue-saturation-based polar representation of pixels of an input image to generate an output image, said apparatus comprising:
   colour correction logic arranged to provide a colour mapping operation defined by a hue alteration amount and a key value associated with each pixel;
   said colour correction logic comprising:
   hue modifying logic for adding a proportion of said hue alteration amount to a hue of each pixel of said input image, said proportion depending on said key value associated with that pixel; and
   saturation modifying logic for modifying a saturation of each pixel in dependence on said hue alteration amount and said key value for that pixel, such that for a key value indicating that only a fraction of said hue alteration amount should be applied to a current pixel, said saturation of that pixel is also modified so that, when expressed with respect to a rectangular chrominance-based colour space, said pixel is moved to a position in that colour space substantially lying on a straight line between an original position of said pixel and a position that said pixel would occupy if said full hue alteration amount were applied.

2. Apparatus according to claim 1, in which said colour mapping operation is defined by said hue alteration amount and a locus in a colour space of a key value, said colour correction logic being operable to detect said key value at that pixel's position in colour space and to apply said colour mapping operation to that pixel in dependence on said key value.

3. Apparatus according to claim 1, in which said hue modifying logic comprises a hue data store, addressable by said key value associated with a pixel, said hue data store providing a hue amount to be added to said hue of the current pixel.

4. Apparatus according to claim 3, being arranged to store hue amount data in said hue data store in respect of each image to be processed.

5. Apparatus according to claim 1, in which said saturation modifying logic comprises a saturation data store, addressable by said key value associated with a pixel, said saturation data store providing an amount by which said saturation of the current pixel should be altered.

6. Apparatus according to claim 5, being arranged to store saturation amount data in said saturation data store in respect of each image to be processed.

7. Apparatus according to claim 1, in which, for a key value indicating that all of said hue alteration amount should be added to said current pixel, said saturation modifying logic is arranged not to alter said saturation of said current pixel.

8. Apparatus according to claim 1, said apparatus being arranged to process a video signal comprising a succession of images.

9. A method of digital image processing for applying pixel-based colour correction to a hue-saturation-based polar representation of pixels of an input image to generate an output image, said method comprising the steps of:
   (i) defining a colour mapping operation by a hue alteration amount and a key value associated with each pixel;
   (ii) adding a proportion of said hue alteration amount to a hue of each pixel of said input image, said proportion depending on said key value associated with that pixel; and
   (iii) modifying a saturation of each pixel in dependence on said hue alteration amount and said key value for that pixel, such that for a key value indicating that only a fraction of said hue alteration amount should be applied to a current pixel, said saturation of that pixel is also modified so that, when expressed with respect to a rectangular chrominance-based colour space, said pixel is moved to a position in that colour space substantially lying on a straight line between an original position of said pixel and a position that said pixel would occupy if said full hue alteration amount were applied.

10. Computer software having program code for carrying out a method according to claim 9.

11. A providing medium for providing software according to claim 10.

12. A medium according to claim 11, said medium being a transmission medium.

13. A medium according to claim 11, said medium being a storage medium.

* * * * *